Figure 1:
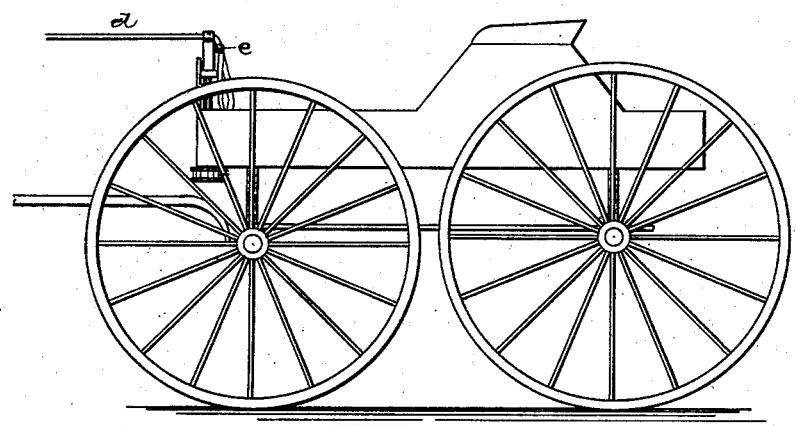
Figure 2:
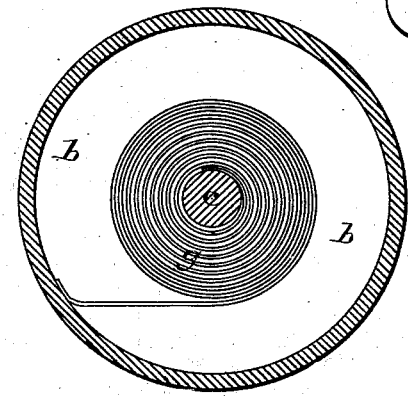
Figure 3:
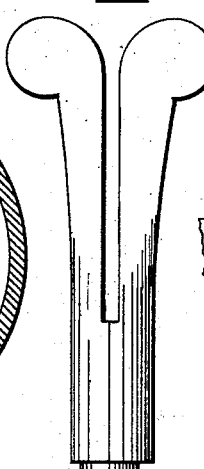
Figure 4:
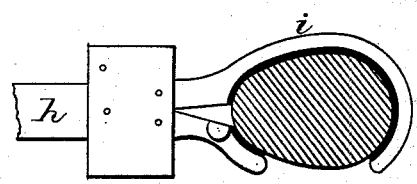
Figure 4:
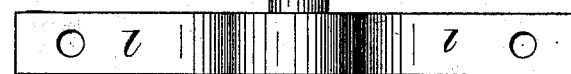
Figure 4:
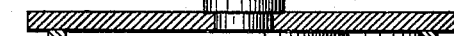
Figure 4:
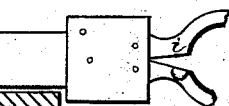

R. FLORYANOWICZ.
Rein-Holder.

No. 207,024. Patented Aug. 13, 1878.

Witnesses:

Inventor:
R. Floryanowicz
F. A. Lehmann,
atty.

N. PETERS, PHOTO-LITHOGRAPHER, WASHINGTON, D. C.

UNITED STATES PATENT OFFICE.

RAYMOND FLORYANOWICZ, OF NEW HAVEN, CONNECTICUT.

IMPROVEMENT IN REIN-HOLDERS.

Specification forming part of Letters Patent No. 207,024, dated August 13, 1878; application filed July 29, 1878.

*To all whom it may concern:*

Be it known that I, R. FLORYANOWICZ, of New Haven, in the county of New Haven and State of Connecticut, have invented certain new and useful Improvements in Rein-Holders; and I do hereby declare the following to be a full, clear, and exact description of the invention, such as will enable others skilled in the art to which it pertains to make and use it, reference being had to the accompanying drawings, which form part of this specification.

My invention relates to an improvement in rein-holders; and it consists in a vertical standard, which is secured to any suitable part of the vehicle, and has a forked end to receive the reins. Secured to the lower end of this shaft is a spring, which keeps a strap or cord wrapped around its shaft, and which spring causes the shaft to revolve the moment it is released, so that all slack of the strap will be instantly taken up, and thus the strap will always be kept in the case, except when in use. To the outer end of the strap is fastened a hook or snap to catch around any one of the spokes of the wheel. Should the horse start the partial revolution of the wheel will draw the strap out and cause the hooked shaft to revolve, and thereby cause the reins to be wrapped tightly around the upper end of the shaft, and thus draw the horse back.

The accompanying drawings represent my invention.

*a* represents a suitable base, which is to be secured to the bottom of the vehicle, its under side, or any other suitable place, as convenience may dictate. Upon the upper side of this base is secured the case or frame *b*, up through the top of which passes the shaft *c*. The upper end of this shaft is forked or recessed, as shown, so as to receive the driving-reins *d*, which reins are provided with hand-holds or any suitable projections *e*, which prevent the reins from being drawn out of the fork.

Wrapped around the lower end of the shaft, inside of the case *b*, is a flat spring, *g*, and also a strap, *h*, of any suitable length. The spring and strap are wrapped in opposite directions, so that when the strap is drawn outward through a hole in the side of the case the spring will be wrapped around the shaft. As soon as the strap is released the unwinding of the spring will cause the shaft to revolve and wrap up the strap again.

Fastened to the outer end of the strap is a suitable snap, *i*, which catches around one of the spokes of the wheel, so that when the horse starts forward the wheel, in turning around, draws the strap out of the case, thereby causing the shaft to turn around and wrap the reins tightly around its upper end. In proportion as the shaft turns around the reins pull backward on the horse, and thus prevent him from going forward. As soon as the horse stops the shaft stops, and should the horse back the slackening of the strap will allow the spring to unwind, and thus cause the shaft to turn backward and loosen the reins on the horse.

In order to allow the strap to run freely out of the case, friction-rollers will be placed on each side of the hole in the case, and in order to prevent the hook or snap from injuring the varnish on the wheel the inside of the hook will be lined with rubber or any other soft material. The shaft will be braced in position by any suitable devices, *l*, to the dash-board or other part of the vehicle.

Having thus described my invention, I claim—

1. The shaft *c*, made to project up to or above the top of the dash-board, and having its upper end recessed to receive the driving-reins, in combination with a spring to revolve the shaft and a strap or cord to catch hold of the wheel, substantially as shown.

2. The combination of the base *a*, case *b*, shaft *c*, having a forked end, a strap, and a spring, substantially as set forth.

In testimony that I claim the foregoing I have hereunto set my hand this 26th day of July, 1878.

RAYMOND FLORYANOWICZ.

Witnesses:
A. M. MOCREWSKI,
F. A. LEHMANN.